US012652210B2

(12) United States Patent
Dang et al.

(10) Patent No.: US 12,652,210 B2
(45) Date of Patent: Jun. 9, 2026

(54) DETECTING CLOUD SERVICE CONNECTIVITY ISSUES THROUGH ANALYSIS OF TENANT NETWORK TRAFFIC SIGNALS

(71) Applicant: MICROSOFT TECHNOLOGY LICENSING, LLC, Redmond, WA (US)

(72) Inventors: Yingnong Dang, Sammamish, WA (US); Yuxuan Chen, Bellevue, WA (US); Youjiang Wu, Seattle, WA (US); Zhangwei Xu, Redmond, WA (US); Nathaniel Elliott Brown, Atlanta, GA (US); Udaivir Yadav, Austin, TX (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 75 days.

(21) Appl. No.: 18/680,629

(22) Filed: May 31, 2024

(65) Prior Publication Data

US 2025/0373483 A1 Dec. 4, 2025

(51) Int. Cl.
| | |
|---|---|
| *G06F 15/173* | (2006.01) |
| *H04L 41/0604* | (2022.01) |
| *H04L 41/16* | (2022.01) |
| *H04L 43/16* | (2022.01) |

(52) U.S. Cl.
CPC .......... *H04L 41/0627* (2013.01); *H04L 41/16* (2013.01); *H04L 43/16* (2013.01)

(58) Field of Classification Search
CPC ...... H04L 41/0627; H04L 41/16; H04L 43/16
See application file for complete search history.

(56) References Cited

U.S. PATENT DOCUMENTS

2019/0007285 A1* 1/2019 Nevo ...................... H04L 43/08

* cited by examiner

*Primary Examiner* — Joseph R Maniwang
(74) *Attorney, Agent, or Firm* — Newport IP, LLC; Jacob P. Rohwer

(57) ABSTRACT

The techniques describe effective detection of network connectivity issues for a cloud service operating in a distributed computing environment. To detect the network connectivity issues, a system first projects network traffic patterns at the tenant level (e.g., on a tenant-by-tenant basis) and compares a tenant's current network traffic to the projected network traffic pattern. If the comparison yields that the current network traffic for the tenant is closely following the projected network traffic pattern, the tenant is deemed healthy. However, if the comparison yields that the current network traffic for the tenant is not closely following the projected network traffic pattern, the tenant is deemed unhealthy. Once the system has made these binary health determinations for various tenants on a tenant-by-tenant basis, the system is configured to aggregate the unhealthy determinations across a group of tenants to determine whether the cloud service is experiencing network connectivity issues.

20 Claims, 9 Drawing Sheets

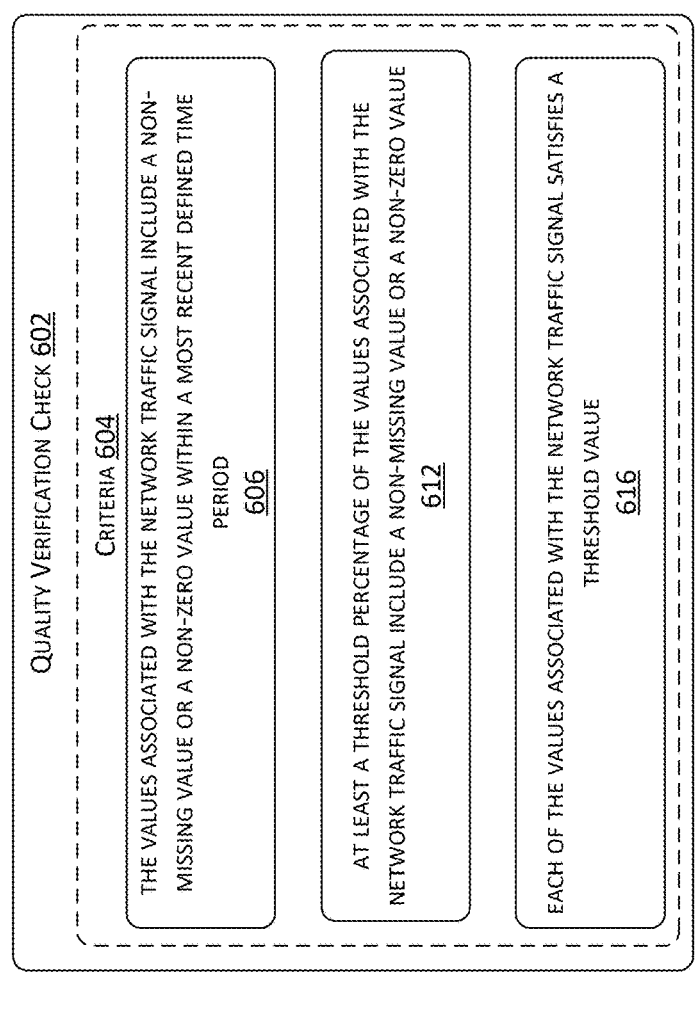

QUALITY VERIFICATION CHECK 602

CRITERIA 604

THE VALUES ASSOCIATED WITH THE NETWORK TRAFFIC SIGNAL INCLUDE A NON-MISSING VALUE OR A NON-ZERO VALUE WITHIN A MOST RECENT DEFINED TIME PERIOD
606

AT LEAST A THRESHOLD PERCENTAGE OF THE VALUES ASSOCIATED WITH THE NETWORK TRAFFIC SIGNAL INCLUDE A NON-MISSING VALUE OR A NON-ZERO VALUE
612

EACH OF THE VALUES ASSOCIATED WITH THE NETWORK TRAFFIC SIGNAL SATISFIES A THRESHOLD VALUE
616

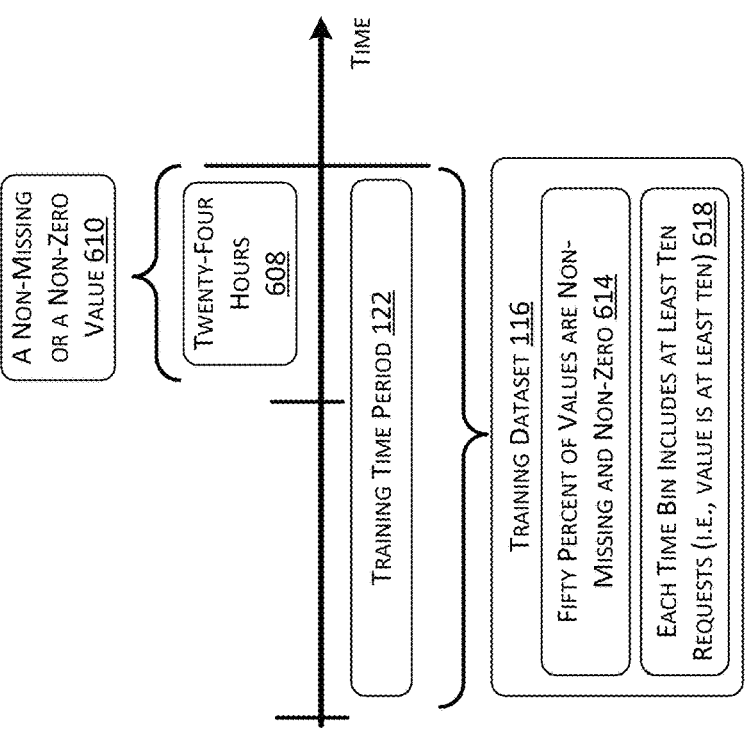

A NON-MISSING OR A NON-ZERO VALUE 610

TWENTY-FOUR HOURS 608

TRAINING TIME PERIOD 122

TIME

TRAINING DATASET 116

FIFTY PERCENT OF VALUES ARE NON-MISSING AND NON-ZERO 614

EACH TIME BIN INCLUDES AT LEAST TEN REQUESTS (I.E., VALUE IS AT LEAST TEN) 618

FIG. 6

GENERATE A TENANT-SPECIFIC MODEL THAT PROJECTS A NETWORK TRAFFIC PATTERN BY ANALYZING A TRAINING DATASET INCLUDING VALUES ASSOCIATED WITH A NETWORK TRAFFIC SIGNAL FOR A TENANT OVER A TRAINING TIME PERIOD
802

DETERMINE THAT A CURRENT VALUE ASSOCIATED WITH THE NETWORK TRAFFIC SIGNAL FOR A CURRENT TIME BIN IS LESS THAN A BASELINE THRESHOLD VALUE ESTABLISHED FOR A CORRESPONDING TIME BIN, AS DEFINED IN THE TENANT-SPECIFIC MODEL
804

DESIGNATE THE TENANT AS AN UNHEALTHY TENANT DUE TO ABNORMAL NETWORK TRAFFIC BEHAVIOR
806

DETERMINE THAT A TOTAL NUMBER OF UNHEALTHY TENANTS FOR THE CURRENT TIME BIN IS GREATER THAN A PREDEFINED THRESHOLD NUMBER OF UNHEALTHY TENANTS
808

SEND, TO AN OWNER OF THE SERVICE AND BASED ON THE TOTAL NUMBER OF UNHEALTHY TENANTS BEING GREATER THAN THE PREDEFINED THRESHOLD NUMBER OF UNHEALTHY TENANTS, A NOTIFICATION INDICATING A POTENTIAL NETWORK CONNECTIVITY ISSUE ASSOCIATED WITH THE SERVICE
810

FIG. 8

DETECTING CLOUD SERVICE CONNECTIVITY ISSUES THROUGH ANALYSIS OF TENANT NETWORK TRAFFIC SIGNALS

A cloud platform such as MICROSOFT AZURE, AMA-ZON WEB SERVICES, GOOGLE CLOUD, etc. is configured to provide resources for various tenants. A tenant may be a customer, a business, an organization, a client, an individual user, and so forth. The datacenters and other infrastructure that comprise the cloud platform are constructed with a variety of different types of "cloud" resources (e.g., processing resources, storage resources, networking resources, power resources, temperature control resources) which work together to not only execute tenant services (e.g., an application), but to also execute cloud services that support and enable execution of the tenant services (e.g., a cloud service is tasked with managing orchestration and deployment via KUBERNETES).

Existing solutions for monitoring the health of a cloud service relies on metrics (e.g., latency, throughput, success rate, error rate) that are dependent upon the tenants' network traffic actually landing on, or being received by, the backend of the cloud service. These metrics are used to evaluate the performance and/or the reliability of the cloud service, which directly affects tenant satisfaction.

SUMMARY

The system disclosed herein is configured to effectively detect network connectivity issues for a cloud service operating in a distributed computing environment. To detect the network connectivity issues for the cloud service, the system analyzes a network traffic signal on a tenant-by-tenant basis. Network traffic reflects a measurable amount of data being received by a frontend network that provides access to the backend of the cloud service. As described with respect to examples discussed herein, the network traffic signal can indicate a total number of requests received on behalf of a tenant within a defined time bin (e.g., one minute, five minutes, ten minutes). However, other types of network traffic signals are contemplated in the context of this disclosure, e.g., a distribution of requests per response code received on behalf of the tenant within the defined time bin.

The frontend network includes a set of resources that are allocated to and/or operated by the cloud service. In one example described below, the set of resources is divided into subsets based on a tenant consideration and a geographic region consideration. That is, a resource that is allocated to and/or operated by the cloud service is deployed in the frontend network such that the resource is solely used by a specific tenant within a defined geographic region where the cloud service operates. Accordingly, the analysis of the network traffic signal described herein is first implemented with respect to a "tenant/resource" combination.

The geographic regions in which the cloud service operates can be smaller (e.g., cities, counties, states/provinces) or larger (e.g., countries, continents). A request received via the frontend network is associated with a timestamp, a tenant identification (e.g., a customer resource identification or "CRID"), and a location identification. Thus, the system can sort requests according to tenants using the tenant identifications and can sort the requests into defined time bins using the timestamps. As further described below, a defined time bin can be specific to a particular hour in a day, a particular day in a week, a particular week in a month, and/or a particular month in a year. Moreover, the system can map the requests to defined geographic regions using the location identification.

Unlike metrics such as success rate, a network traffic signal such as a total number of requests received is not normalized to a value between zero and one. Rather, such a network traffic signal is limitless or unbounded, e.g., can range from zero to infinity. Accordingly, the network traffic signal can significantly vary from one tenant to the next and/or significantly fluctuate based on seasonality (e.g., hourly seasonality, daily seasonality, weekly seasonality, yearly seasonality). The aforementioned variability and/or fluctuation in the network traffic signal makes it challenging to effectively detect network connectivity issues for a cloud service. To illustrate, some tenants may have stable network traffic patterns throughout a day or a week, while other tenants may have seasonal, sparse, and/or unpredictable network traffic patterns. For instance, an education institution is likely to send less network traffic over the weekend, while a hotel is likely to send more network traffic over the weekend.

To address this challenge, the system described herein first projects network traffic patterns at the tenant level (e.g., on a tenant-by-tenant basis). For instance, the system analyzes a training dataset to generate a tenant-specific model that projects a network traffic pattern. The training dataset is unique to a tenant and a geographic region in which a resource is deployed to handle the tenant's network traffic. Therefore, the training dataset includes values for the network traffic signal with respect to the tenant/resource combination. As mentioned above, one of the values can reflect the total number of requests received at the frontend network, or the deployed resource, per time bin. The training dataset can be limited to a predefined training time period (e.g., the most recent seven days, the most recent fourteen days, the most recent two months, the most recent year).

The network traffic pattern projected by the tenant-specific model establishes a baseline threshold value. As further discussed herein, the baseline threshold value is dynamic such that it can change from one defined time bin to another define time bin to accommodate network traffic fluctuations due to seasonality. The system is configured to calculate the baseline threshold value by testing the training dataset for seasonal patterns in one or more time series. That is, the system identifies, in the training dataset, a seasonal pattern in an hourly time series, a seasonal pattern in a daily time series, a seasonal pattern in a weekly time series, a seasonal pattern in a monthly time series, and/or a seasonal pattern in a yearly time series. In one example, the system decomposes the seasonal pattern identified in each time series by removing the seasonal pattern from the training dataset. This decomposition leaves, or produces, a residual training dataset. Next, the system applies a power transformation (e.g., a Box-Cox power transformation) to the residual training dataset to stabilize the variance and normalize the distribution. The power transformation produces a transformed residual training dataset. The system then applies a seasonality-based adjusted boxplot algorithm (e.g., Tukey's range test) to the transformed residual training dataset to project a normal range for the network traffic signal, with respect to the "tenant/resource" combination, across the time bins in the training time period. The system uses the lower bound of the normal range as the baseline threshold value. However, the system can calculate the baseline threshold value in other ways as well. For example, the system can establish the baseline threshold value to be a predefined percentage (e.g., 25%, 30%, 40%) below an average value for the network traffic signal for a group of corresponding time bins (e.g., the 9:00-9:10 am time bin on Monday through Friday).

Once generated, the system applies the tenant-specific model to a current value associated with the network traffic signal for a current time bin (e.g., a total number of request received for the tenant in the last five minutes). The system maps the current time bin to a corresponding time bin in the tenant-specific model to determine whether the current value is inconsistent with (e.g., less than) the baseline threshold value established for the corresponding time bin in the tenant-specific model.

If the current value for a current time bin is inconsistent with the baseline threshold value established for the corresponding time bin in the tenant-specific model, then the tenant's network traffic behavior is not following the projected network traffic pattern. Stated alternatively, the tenant's network traffic behavior, as detected with respect to a resource deployed to a geographic region of the cloud service, is abnormal and the system flags this abnormality by designating the tenant as an unhealthy tenant. If the current value for the current time bin satisfies the baseline threshold value (e.g., is greater than or equal to the baseline threshold value), then the tenant's network traffic behavior is normal as it follows the projected network traffic pattern. Accordingly, the system designates the tenant as a healthy tenant when their network traffic behavior is normal. Consequently, the system makes a binary health determination, e.g., healthy or unhealthy, with respect to a tenant/resource combination.

Now that the system has made binary health determinations for various tenant/resource combinations within a geographic region, the system is configured to aggregate the binary health determinations for the geographic region. More specifically, the system determines a total number of unhealthy tenants associated with the geographic region for the current time bin. The system compares the total number of unhealthy tenants to a predefined threshold number of unhealthy tenants. If the total number of unhealthy tenants is greater than the predefined threshold number of unhealthy tenants, the system generates and/or sends a notification to an owner, or a provider, of the cloud service. The notification indicates a potential network connectivity issue associated with the cloud service in the geographic region. In various examples, the notification can include the identifications of the tenants impacted by the potential network connectivity issue, as well as other information.

In one embodiment, the system is configured to establish the threshold number of unhealthy tenants by first calculating an N-day (e.g., seven days, fourteen days, thirty days) moving average number of unhealthy tenants, e.g., across the defined time bins in the N days. Next, the system can calculate the standard deviation associated with the N-day moving average number. The standard deviation is the square root of the variance of the N-day moving average number, and is commonly referred to as sigma, or "$\sigma$". The system calculates the deviation of each number of unhealthy tenants per time bin, and squares the result. The variance is the average of the squared results and, as mentioned above, the standard deviation is equal to the square root of the variance. The threshold number of unhealthy tenants can be established to be a predefined number of standard deviations (e.g., "$2\sigma$", "$3\sigma$", "$4\sigma$", "$5\sigma$") above the N-day moving average number. However, the system can establish the threshold number of unhealthy tenants in other ways as well. For example, the system can establish the threshold number of unhealthy tenants to be a predefined percentage (e.g., 10%, 20%, 30%) above the N-day moving average number.

One of the technical benefits of the present disclosure includes the ability to detect large-scale abnormal tenant network traffic patterns so that network connectivity issues within a cloud service can be identified at the geographic region level much earlier. Simply monitoring the overall network traffic volume for a large number of tenants can lead to inaccurate results due to false positives or false negatives. For example, the overall network traffic volume is susceptible to events such as cloud service update deployments and/or cloud service maintenance, which often causes the overall network traffic volume to drop at a geographic region. Additionally, the overall network traffic volume can be dominated by heavier network traffic tenants, and therefore, can mask network connectivity issues being experienced by lighter network traffic tenants. Furthermore, metrics, such as latency, throughput, success rate, and error rate, are dependent upon the tenants' network traffic actually landing on, or being received by, the backend of the cloud service.

The solution outlined above accounts for the shortcomings of existing solutions with respect to detecting when a tenant is having trouble connecting to the backend of the cloud service. The solution outlined above also accounts for the shortcomings of existing solutions with respect to focusing on signals that are dependent upon tenants' network traffic actually landing on, or being received by, the backend of the cloud service. For example, the monitoring may indicate a one hundred percent "success rate" for a tenant's requests that landed on the backend of the cloud service. However, it is possible that only up to fifty percent of the tenant's request actually landed on the backend of the cloud service. So even though the tenant's requests that were received by the backend of the cloud service were overwhelming handled in a successful manner, a network outage may have prevented other tenant requests from reaching the backend of the cloud service in the first place. Using existing solutions, this network connectivity issue would have been undetected for an extended period of time because the aforementioned metrics provide no insight into whether a network connectivity issue is on the cloud service side or a side of a specific tenant. In fact, the detection of the network connectivity issue would likely be based solely on explicit tenant feedback (e.g., reports) of requests that were successfully handled.

In one embodiment, the system ensures the quality of the training dataset by verifying the training dataset meets certain criteria. If the criteria are not met, the system can exclude a tenant/resource combination from the aggregation of unhealthy tenants to improve the precision at which a network connectivity issue can be detected.

A first example criterion requires a non-missing value or a non-zero value within a resource deletion time period. The resource deletion time period is a predefined most recent time period (e.g., the most recent twenty-four hours) of the training time period (e.g., fourteen days). Accordingly, the system ensures the quality of the training dataset by verifying the values associated with network traffic signal, which are specific to a tenant/resource combination, reflect a non-missing value or a non-zero value within a resource deletion time period prior to using the values to generate the tenant-specific model. If the first example criterion is not met, the resource is deemed to likely be a deleted resource which causes the network traffic signal to include false network traffic drops (e.g., failure to receive requests) that negatively affect the quality of the training dataset.

A second example criterion requires that at least a threshold percentage (e.g., 50%) of the values associated with network traffic signal are a non-missing value or a non-zero value within the training time period. Accordingly, the system ensures the quality of the training dataset by verifying that at least the threshold percentage of the values associated with network traffic signal within the training time period, which are specific to a tenant/resource combination, are a non-missing value or a non-zero value prior to using the values to generate the tenant-specific model. If the second example criterion is not met, the resource is likely an inactive resource which also causes the network traffic signal to include false network traffic drops that negatively affect the quality of the training dataset.

A third example criterion requires that a value for each time bin in the training time period satisfies a threshold value (e.g., the number of requests in a time bin is at least ten requests). Accordingly, the system ensures the quality of the training dataset by verifying that each time bin includes at least a threshold number of requests related to the network traffic signal. The third example criterion is used to avoid false positives due to lower network traffic volume tenants, which are relatively more susceptible to volatility. That is, a drop of first tenant's requests from an expected value of four to a value of two is more likely normal, and thus, not as significant as a drop of second tenant's requests from an expected value of one hundred to a value of fifty.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 6 is a diagram illustrating an example approach to verifying the quality of data used in the training dataset by filtering out data that does not satisfy defined criteria.

FIG. 8 is a flow diagram showing aspects of a method for detecting network connectivity issues for a cloud service.

DETAILED DESCRIPTION

Figure 1:
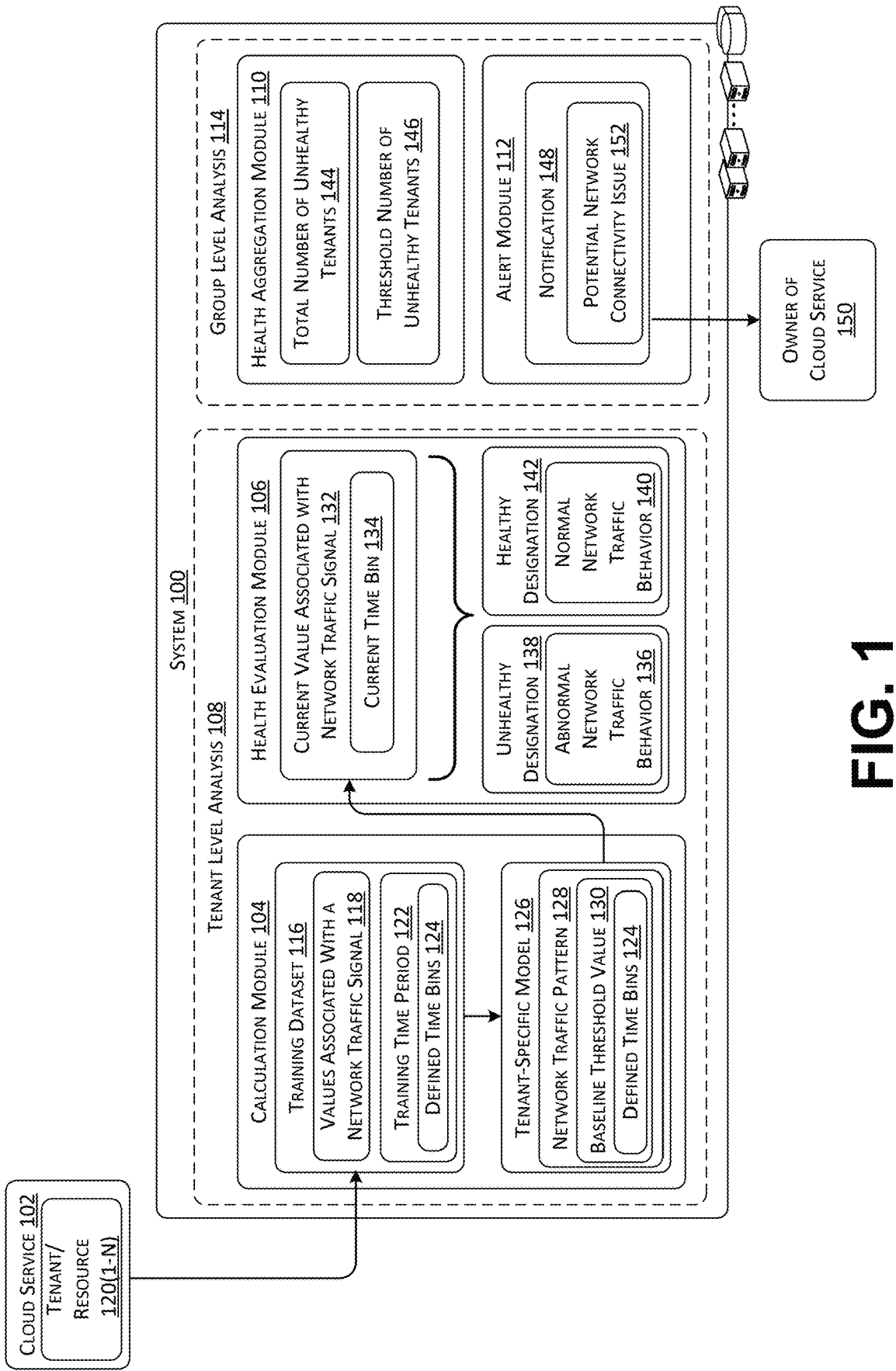
FIG. 1 is a diagram illustrating an example environment in which a system detects network connectivity issues for a cloud service.

The techniques and technologies disclosed herein effectively detect network connectivity issues for a cloud service operating in a distributed computing environment. To detect the network connectivity issues for the cloud service, the system analyzes a network traffic signal on a tenant-by-tenant basis. Network traffic reflects a measurable amount of data being received by a frontend network that provides access to the backend of the cloud service. As described with respect to examples discussed herein, the network traffic signal can indicate a total number of requests received on behalf of a tenant within a defined time bin (e.g., one minute, five minutes, ten minutes). However, other types of network traffic signals are contemplated in the context of this disclosure, e.g., a distribution of requests per response code received on behalf of the tenant within the defined time bin.

Existing solutions for monitoring the health of a cloud service rely on metrics, such as success rate, that are dependent upon the tenants' network traffic actually landing on, or being received by, the backend of the cloud service. These metrics are used to evaluate the performance and/or the reliability of the cloud service, which directly affects tenant satisfaction. However, existing solutions are deficient with respect to considering whether some of the tenants' network traffic is even able to connect to the backend of the cloud service due to frontend network connectivity issues such as network traffic congestion, Domain Name System (DNS) misconfigurations, and/or programming bugs causing tenants to artificially reach quota limits related to a number of requests. Stated alternatively, if the tenants' network traffic cannot connect to the backend of the cloud service, the cloud service essentially stops producing and monitoring the aforementioned metrics that the existing solutions rely on to evaluate the performance and/or reliability of the cloud service. Alternatively, if some of the tenants' network traffic is able to connect to the backend of the cloud service and some of tenants' network traffic is not able to connect to the backend of the cloud service, the monitoring of tenants' network traffic that is able to connect to the backend of the cloud service indicates acceptable performance and reliability, which thereby can provide a false sense of tenant satisfaction.

Furthermore, unlike metrics such as success rate, a network traffic signal such as a total number of requests received is not normalized to a value between zero and one. Rather, such a network traffic signal is limitless or unbounded, e.g., can range from zero to infinity. Accordingly, the network traffic signal can significantly vary from one tenant to the next and/or significantly fluctuate based on seasonality (e.g., hourly seasonality, daily seasonality, weekly seasonality, yearly seasonality), or network traffic signal can vary for no immediately apparent reason at all. The aforementioned variability and/or fluctuation in the network traffic signal makes it challenging to effectively detect network connectivity issues for a cloud service. To illustrate, some tenants may have stable network traffic patterns throughout a day or a week, while other tenants may have seasonal, sparse, and/or unpredictable network traffic patterns. In a specific example, an education institution is likely to send less network traffic over the weekend, while a hotel is likely to send more network traffic over the weekend.

To address this challenge, the system described herein first projects network traffic patterns at the tenant level (e.g., on a tenant-by-tenant basis) and compares a tenant's current network traffic to the projected network traffic pattern. If the comparison yields that the current network traffic for the tenant is closely following the projected network traffic pattern, the tenant is deemed healthy. However, if the comparison yields that the current network traffic for the tenant is not closely following the projected network traffic pattern, the tenant is deemed unhealthy. Once the system has made these binary health determinations for various tenants on a tenant-by-tenant basis, the system is configured to aggregate the unhealthy determinations across a group of tenants to determine whether the cloud service is experiencing network connectivity issues.

Various examples, scenarios, and aspects of the disclosed techniques that detect network connectivity issues for a cloud service are described below with reference to FIGS. 1-9.

FIG. 1 illustrates an example environment in which a system 100 effectively detects network connectivity issues for a cloud service 102. Operation of the cloud service 102 may be limited to a cloud platform (e.g., one or more datacenters). Alternatively, operation of the cloud service may expand across a distributed computing environment (e.g., one or more datacenters, one or more edge networks, one or more on-premises networks, or a combination thereof). The system 100 includes a calculation module 104 and a health evaluation module 106 that analyze data and/or operate at the tenant level 108. Furthermore, the system includes a health aggregation module 110 and an alert module 112 that analyze data and/or operate at the group level 114 (e.g., a group of tenants). The number of modules illustrated in FIG. 1 is just an example, and the number can vary. That is, functionality described herein in association with the illustrated modules can be performed by a fewer number of modules or a larger number of modules on one device (e.g., server) in the system 100 or spread across multiple devices in the system 100.

The calculation module 104 is configured to receive and/or access a training dataset 116. The training dataset 116 includes values associated with a network traffic signal 118. As described above, network traffic reflects a measurable amount of data being received by a frontend network that provides access to the backend of the cloud service 102. The network traffic signal can indicate a total number of requests received on behalf of a tenant within a defined time bin. However, other types of network traffic signals are contemplated in the context of this disclosure, e.g., a distribution of requests per response code received on behalf of the tenant within the defined time bin.

In one example, the training dataset 116 is unique to a tenant and a geographic region in which a resource is deployed to handle the tenant's network traffic. That is, the frontend network includes a set of resources that are allocated to and/or operated by the cloud service 102. The set of resources is divided into subsets based on a tenant consideration and a geographic region consideration. That is, a resource that is allocated to and/or operated by the cloud service 102 is deployed in the frontend network such that the resource is solely used by a specific tenant within a defined geographic region where the cloud service 102 operates.

Therefore, the values associated with the network traffic signal 118 represent not only a specific tenant, but a particular resource deployed in association with a cloud platform. Accordingly, FIG. 1 illustrates that the cloud service 102 is configured with an N number of tenant/resource combinations 120(1-N). It is noted that N is used throughout this document to represent a number (e.g., one, two, three, five, ten, one hundred, one thousand, one million) for different elements. While the number N from one element to another may be the same, it is more likely that the number N differs from one element to the next (e.g., the number of tenant/resource combinations is different than the number of geographic regions in which the cloud service 102 operates).

The training dataset 116 can be limited to a predefined training time period 122 (e.g., the most recent seven days, the most recent fourteen days, the most recent two months, the most recent year) to better reflect up-to-date network traffic tendencies. Furthermore, the training dataset 116 is sorted according to defined time bins 124. In the aforementioned example of a network traffic signal, a single value in the training dataset 116 can reflect the total number of requests received at the frontend network for a tenant in one time bin (e.g., a one minute period, a five minute period, a ten minute period, a sixty minute period).

Using the training dataset 116, the calculation module 104 generates a tenant-specific model 126 that projects a network traffic pattern 128. The network traffic pattern 128 projected by the tenant-specific model 126 establishes a baseline threshold value 130. As further discussed herein with respect to FIG. 4, the baseline threshold value 130 is dynamic such that it can change in accordance with the defined time bins 124, e.g., from one defined time bin to another defined time bin, to accommodate network traffic fluctuations due to seasonality.

The health evaluation module 106 is then configured to apply the tenant-specific model 126 to a current value associated with the network traffic signal 132 for a current time bin 134 (e.g., a total number of request received for the tenant in the last five minutes). The health evaluation module 106 maps the current time bin 134 to a corresponding time bin in the tenant-specific model 126 (e.g., the time bin for Tuesday from 9:00-9:05 am local time) to determine whether the current value 132 is inconsistent with (e.g., less than) the baseline threshold value 130 established for the corresponding time bin in the tenant-specific model 126.

If the current value 132 for the current time bin 134 is inconsistent with the baseline threshold value 130 established for the corresponding time bin in the tenant-specific model 126, then the tenant's network traffic behavior is not following the projected network traffic pattern 128. Stated alternatively, the tenant's network traffic behavior, as detected with respect to a resource deployed to a geographic region of the cloud service 102, is abnormal 136 and the health evaluation module 106 flags this abnormality by designating the tenant as an unhealthy 138 tenant. If the current value 132 for the current time bin 134 satisfies the baseline threshold value 130 (e.g., is greater than or equal to the baseline threshold value 130), then the tenant's network traffic behavior is normal 140 as it follows the projected network traffic pattern 128. Accordingly, the health evaluation module 106 designates the tenant as a healthy 142 tenant when their network traffic behavior is normal. Consequently, the system 100 is configured to make a binary health determination, e.g., unhealthy 138 or healthy 142, at the tenant level 108 for a plurality of tenant/resource combinations 120(1-N).

Now that the system has made binary health determinations for various tenant/resource combinations 120(1-N), the analysis moves to the group level 114. That is, the health aggregation module 110 is configured to aggregate the binary health determinations, e.g., with respect to a particular geographic region. More specifically, the health aggregation module 110 determines a total number of unhealthy tenants 144 associated with the geographic region for the current time bin 134. The health aggregation module 110 compares the total number of unhealthy tenants 144 to a predefined threshold number of unhealthy tenants 146. If the total number of unhealthy tenants 144 is greater than the predefined threshold number of unhealthy tenants 146, the alert module 112 generates and/or sends a notification 148 to an owner 150, or a provider, of the cloud service 102. The notification 148 indicates a potential network connectivity issue 152 associated with the cloud service 102 in the particular geographic region. For example, the notification 148 serves as an indication to perform root-cause analysis to determine whether the resources deployed in a geographic region for use by a group of tenants are experiencing network traffic congestion, Domain Name System (DNS) misconfigurations, and/or programming bugs causing tenants to artificially reach quota limits related to a number of requests.

One of the technical benefits of the present disclosure includes the ability to detect large-scale abnormal tenant network traffic patterns so that network connectivity issues within a cloud service 102 can be identified at the geographic region level much earlier. Simply monitoring the overall network traffic volume for a large number of tenants can lead to inaccurate results due to false positives or false negatives. For example, the overall network traffic volume is susceptible to events such as cloud service update deployments and/or cloud service maintenance, which often causes the overall network traffic volume to drop at a geographic region. Additionally, the overall network traffic volume can be dominated by heavier network traffic tenants, and therefore, can mask network connectivity issues being experienced by lighter network traffic tenants.

Figure 2:
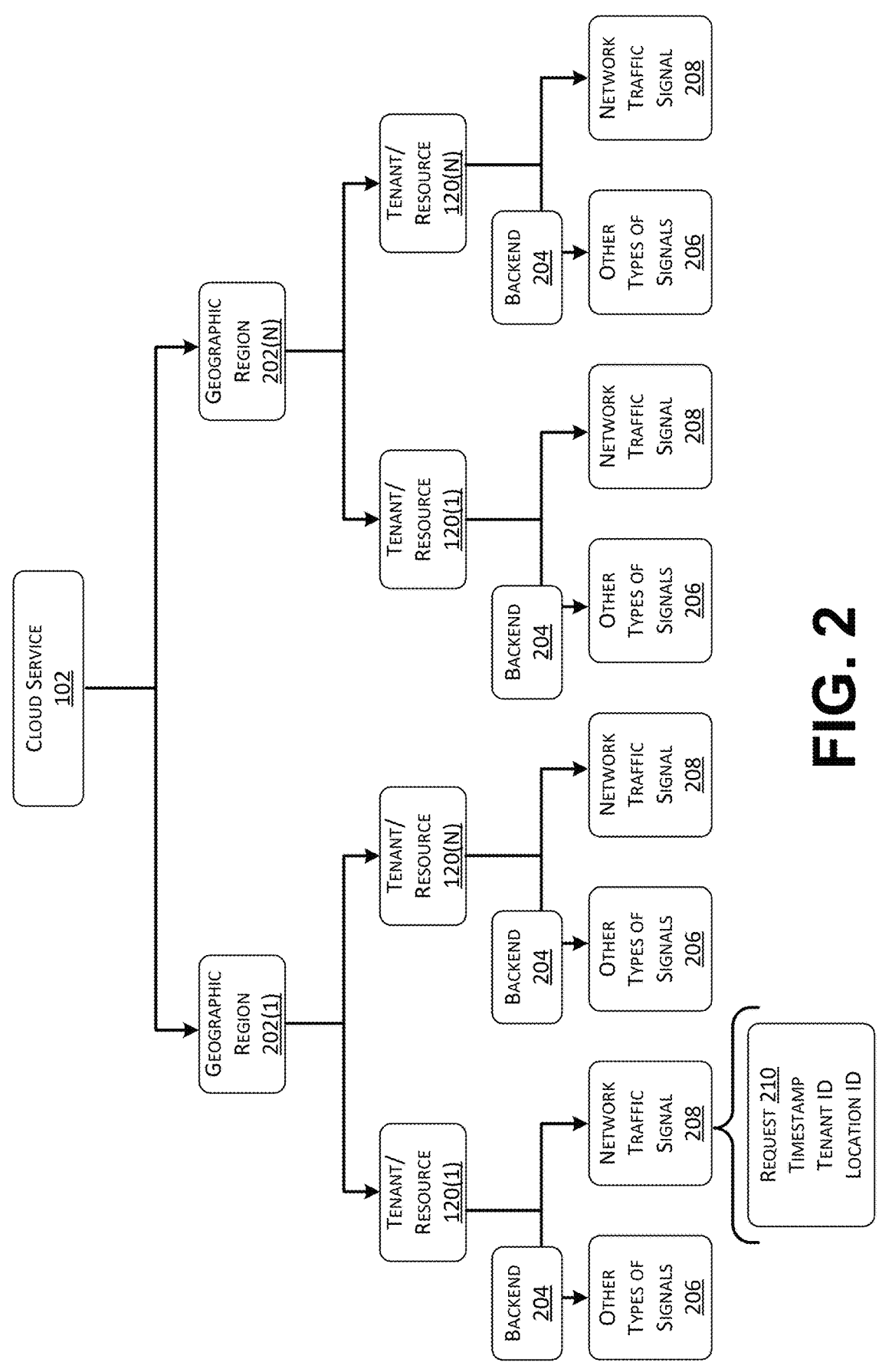
FIG. 2 is a diagram illustrating an example hierarchy within which a cloud service deploys network traffic-based resources for use by different tenants.

FIG. 2 is a diagram illustrating an example hierarchy within which a cloud service 102 deploys network traffic-based resources for use by different tenants. As shown, the cloud service 102 is configured to operate in geographic regions 202(1-N). The geographic regions 202(1-N) in which the cloud service operates can be smaller (e.g., cities, counties, states/provinces) or larger (e.g., countries, continents). As described above, a frontend network associated with the cloud service 102 includes various resources that are individually deployed for, and dedicated to, specific tenants. Accordingly, FIG. 2 illustrates that each of the individual regions 202(1-N) are divided into tenant/resource combinations 120(1-N), where N in this context may be different from one geographic region to a next geographic region. In one example, the tenant/resource combination is an AZURE RESOURCE MANAGER (ARM) resource.

Existing solutions for monitoring the health of a cloud service 102 relies on metrics (e.g., latency, throughput, success rate, error rate) that are dependent upon the tenants' network traffic actually landing on, or being received by, the backend 204 of the cloud service 102. These metrics are used to evaluate the performance and/or the reliability of the cloud service 102, which directly affects tenant satisfaction. The aforementioned metrics are represented in FIG. 2 as other types of signals 206. For example, the other types of signals 206 may indicate a one hundred percent "success rate" for a tenant's requests that landed on the backend 204 of the cloud service 102. However, it is possible that only up to fifty percent of the tenant's request actually landed on the backend 204 of the cloud service 102. So even though the tenant's requests that were received by the backend 204 of the cloud service 102 were overwhelmingly handled in a successful manner, a network outage may have prevented other tenant requests from reaching the backend 204 of the cloud service 102 in the first place. Using existing solutions, this network connectivity issue would have been undetected for an extended period of time because the aforementioned other types of signals 206 provide no insight into whether a network connectivity issue is on the cloud service 102 side or a side of a specific tenant. In fact, the detection of the network connectivity issue would likely be based solely on explicit tenant feedback (e.g., reports) of requests that were unsuccessfully handled.

By using a network traffic signal 208, the techniques describe herein account for the shortcomings of existing solutions with respect to detecting when a tenant is having trouble connecting to the backend 204 of the cloud service 102. As described above, the network traffic signal can be a total number of requests received on behalf of a tenant per defined time bin. As shown in FIG. 2, a request 210 received via the frontend network is associated with a timestamp, a tenant identification (e.g., a customer resource identification or "CRID"), and a location identification. Thus, the cloud service 102 can sort requests 210 according to tenants using the tenant identifications and can sort the requests 210 into defined time bins using the timestamps. The request 210 is counted in the network traffic signal 208 (e.g., the total number of requests) whether the request is able to connect to the backend or not. As further described below, a defined time bin can be specific to a particular hour in a day, a particular day in a week, a particular week in a month, and/or a particular month in a year. Moreover, the system can map the requests 210 to defined geographic regions 202(1-N) using the location identification.

Figure 3:
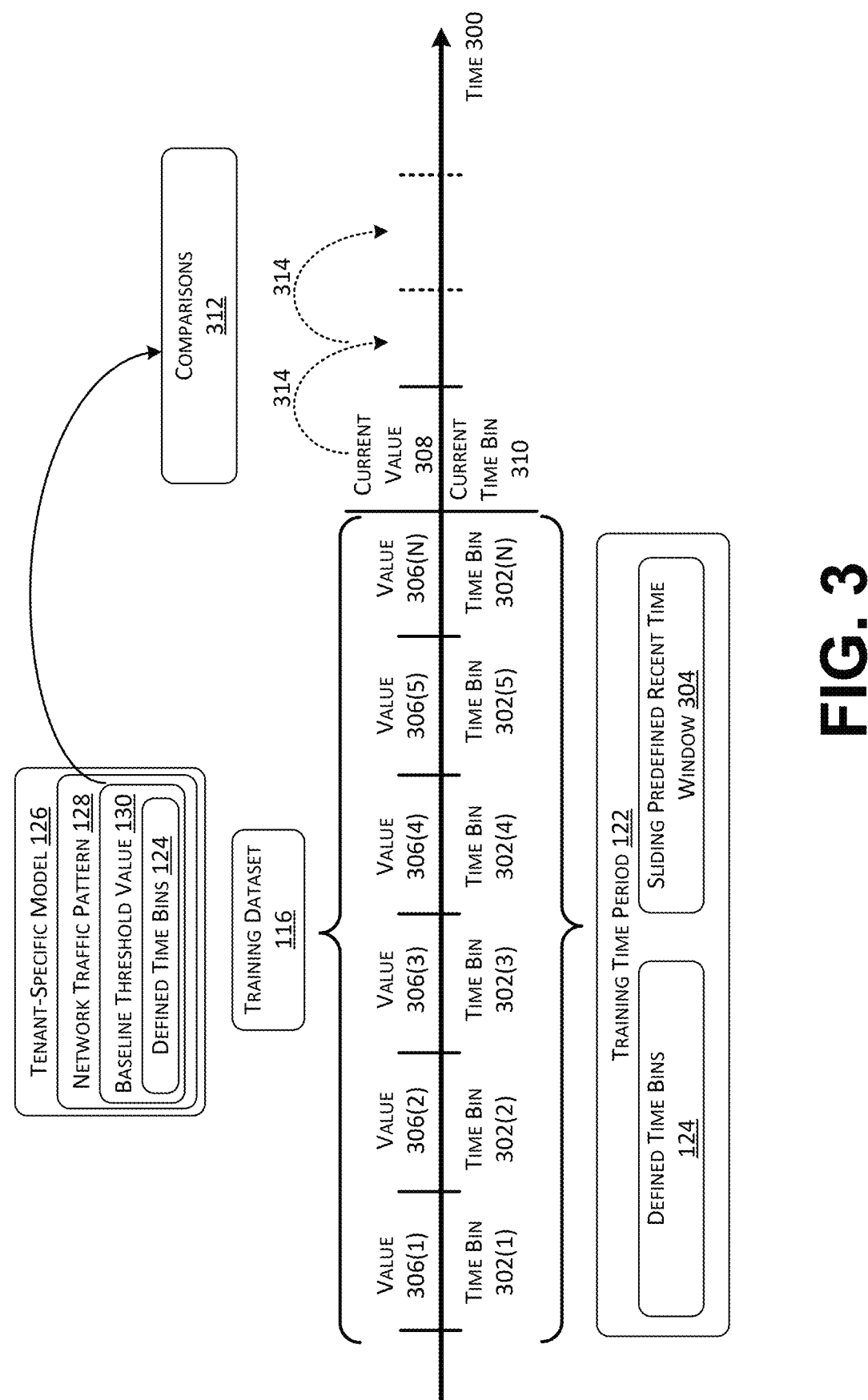
FIG. 3 is a diagram illustrating timing considerations with respect to a training time period, defined time bins, and a current time bin.

FIG. 3 is a diagram illustrating timing considerations with respect to a training time period, defined time bins, and a current time bin. As shown, FIG. 3 includes a time axis 300. The training time period 122 is divided into defined time bins 124 (e.g., one minute, five minutes, ten minutes, one hour). More specifically, the defined time bins 124 are represented by time bin 302(1), time bin 302(2), time bin 302(3), time bin 302(4), time bin 302(5), and time bin 302(N). Thus, six time bins are shown for ease of discussion, i.e., N in this example equals six. However, the number N of defined time bins in most training time periods 122 is a much larger (e.g., hundreds or thousands of defined time bins). In one example, the training time period 122 is a sliding predefined recent time window 304 (e.g., the most recent day, the most recent week, the most recent two weeks, the most recent month, the most recent the most recent year).

Each time bin 302(1-N) is configured to produce a value 306(1-N) associated with the network traffic signal. In one of the examples mentioned above, a single value 306(1) represents a total number of requests received on behalf of a tenant in a defined time bin 302(1). The time axis 300 further shows that a current value 308 is received and/or accessed for a current time bin 310. The current time bin 310 is mapped to a corresponding time bin, e.g., time bin 302(1), in the training time period 122. For example, if the current time bin 310 indicates a particular five minute time period in a week (e.g., 9:00-9:05 am local time on a current Tuesday), then the corresponding time bin 302(1) in the training time period 122 is the same five minute time period in the previous week or previous weeks (e.g., 9:00-9:05 am local time on Tuesday the week before, or for any number of 9:00-9:05 am local time slots from previous Tuesdays). In another example, if the current time bin 310 (e.g., current time bin 134) indicates a particular one hour time period in a month (e.g., 9:00-10:00 am local time on the first of the current month), then the corresponding time bin 302(1) in the training time period 122 is the one hour time period in the previous month (e.g., 9:00-10:00 am local time on the first of the previous month).

As described above, the training dataset 116 is used to generate the tenant-specific model 126, which includes a network traffic pattern 128 defining a dynamic baseline threshold value 130 that accounts for variations in the values 306(1-N) over the defined time bins 302(1-N). The baseline threshold value 130 serves as an anchor for performing comparisons 312 using a corresponding time bin 302(1). That is, the health evaluation module 106 compares the current value 308 (e.g., current value 132) to the baseline threshold value 130 established for the corresponding time bin 302(1) in the training time period 122 to determine a healthy 142 or unhealthy 138 designation for the tenant. As represented by the dashed lines/arrows 314, the comparison 312 is repeated as time progresses and "new" current values for new current time bins are received or become accessible.

In one embodiment, the calculation module 104 uses a sampling algorithm to select which tenant/resource combinations 120(1-N) contribute to the training dataset 116. Given that some cloud services have millions of tenants, a sampling algorithm improves computational efficiency for limiting the analysis/calculations performed herein on a sampled set of the millions of tenants. In one example, the sampling algorithm includes a default sampling rate (e.g., "0.5"), a minimum sample size (e.g., "100"), and a maximum sample size (e.g., "100,000"). If a geographic region has a number of N tenant/resource combinations 120(1-N) that is less than the minimum sample size (e.g., N<"100"), then all the tenant/resource combinations 120(1-N) are used for training purposes. If a geographic region has a number of N tenant/resource combinations 120(1-N) that is greater than the minimum sample size (e.g., N>"100") and less than the maximum sample size (e.g., N<"100,000"), but using the default sampling rate produces a number that is less than the minimum sample size, then the sampling rate is increased to ensure the minimum sample size is satisfied. If a geographic region has a number of N tenant/resource combinations 120(1-N) that is greater than the maximum sample size (e.g., N>"100,000"), but using the default sampling rate produces a number that is still larger than the maximum sample size, then the sampling rate is decreased to ensure the maximum sample size is satisfied. If a geographic region has a number of N tenant/resource combinations 120(1-N) that is greater than the minimum sample size (e.g., N>"100") and less than the maximum sample size (e.g., N<"100,000"), and using the default sampling rate produces a number that is between the minimum sample size and the maximum sample size, then the default sampling rate is used to sample the number of N tenant/resource combinations 120(1-N).

Figure 4:
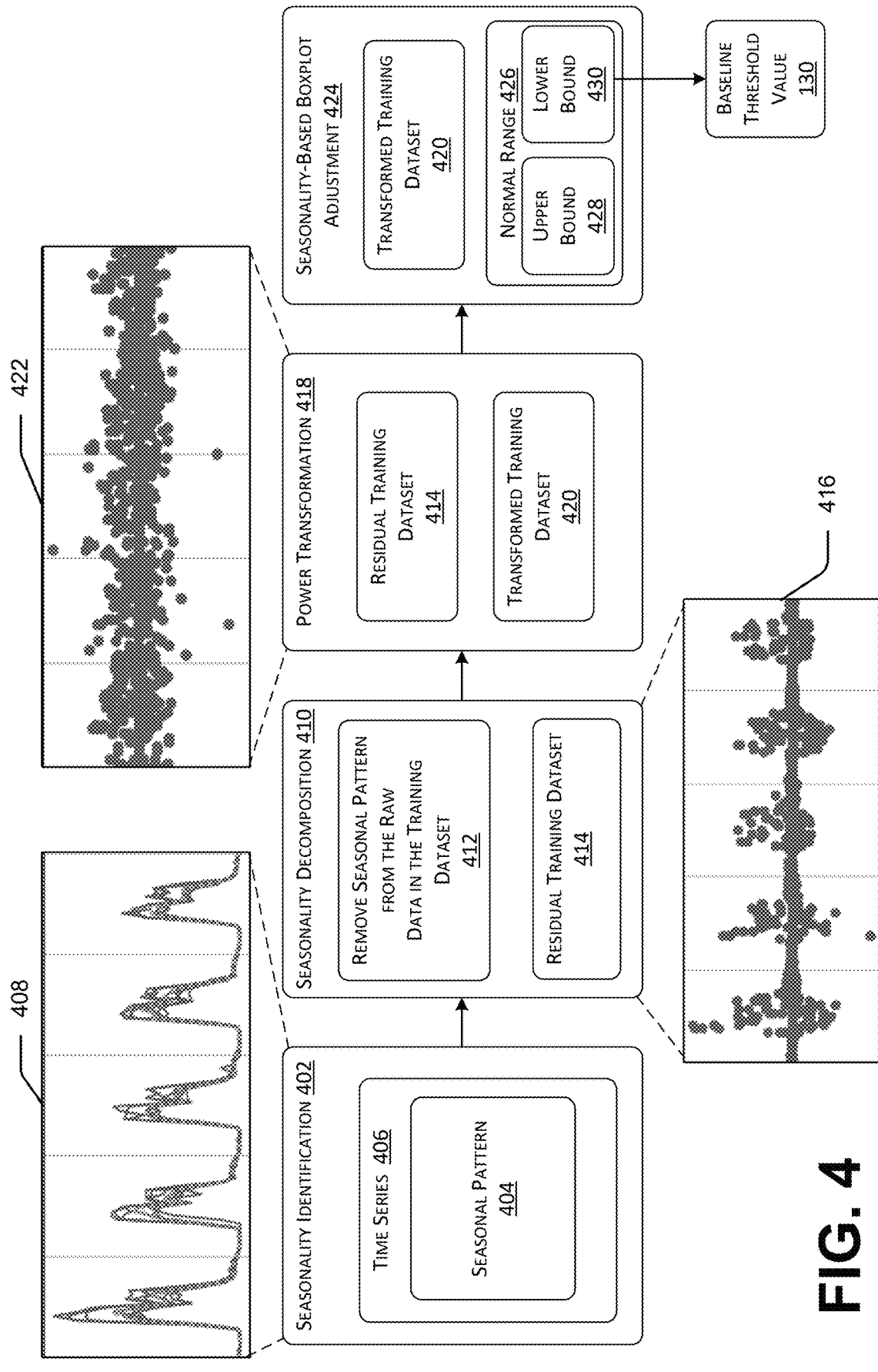
FIG. 4 is a diagram illustrating an example approach to calculating the baseline threshold value.

FIG. 4 is a diagram illustrating an example approach to calculating the baseline threshold value. This example illustrates how the system 100 accounts for tracking resource health during seasonal variations in network traffic, though other sources of variation may be accounted for by the system 100 as well. The calculation module 104 is first configured to implement seasonality identification 402 by testing the training dataset 116 for a seasonal pattern 404 in each of one or more time series 406. The time series include hourly time series, daily time series, weekly time series, monthly time series, or yearly time series. An example line chart 408 shows the values associated with the network traffic signal reflect hourly and daily seasonality (e.g., the line chart 408 plots five days of training values-a work week time series).

Next, the calculation module 104 implements seasonality decomposition 410 by removing 412 the seasonal patterns (e.g., the hourly seasonal pattern and daily seasonal pattern) from the raw data in the training dataset 116. This seasonality decomposition 410 leaves, or produces, a residual training dataset 414, as shown in the example plot chart 416.

Next, the calculation module 104 implements a power transformation 418 to the residual training dataset 414 to stabilize the variance and normalize the distribution. The power transformation 418 produces a transformed training dataset 420, as shown in the example plot chart 422. In one example, the power transformation 418 is a Box-Cox power transformation. However, other power transformations such as a low dispersion transformation can be used based on the range, mean, variance, standard deviation, spread, etc. of the residual training dataset 414.

The calculation module 104 then implements a seasonality-based boxplot adjustment 424 to the transformed training dataset 420 to project a normal range 426 for the network traffic signal, with respect to the tenant/resource combination 120(1), across the defined time bins 124 in the training time period 122. The normal range 426 is dynamic such that an upper bound 428 and a lower bound 430 are calculated for each time bin. In one example, seasonality-based boxplot adjustment 424 is Tukey's Range Test. The calculation module 104 uses the lower bound 430 of the normal range 426 as the baseline threshold value 130, which can then be applied in comparisons involving a current time value 132 for a current time bin 134. However, the calculation module 104 can calculate the baseline threshold value 130 in other ways as well. For example, the calculation module 104 can establish the baseline threshold value 130 to be a predefined percentage (e.g., 25%, 30%, 40%) below an average value for the network traffic signal for a group of corresponding time bins (e.g., the 9:00-9:10 am time bin on Monday through Friday).

Figure 5:
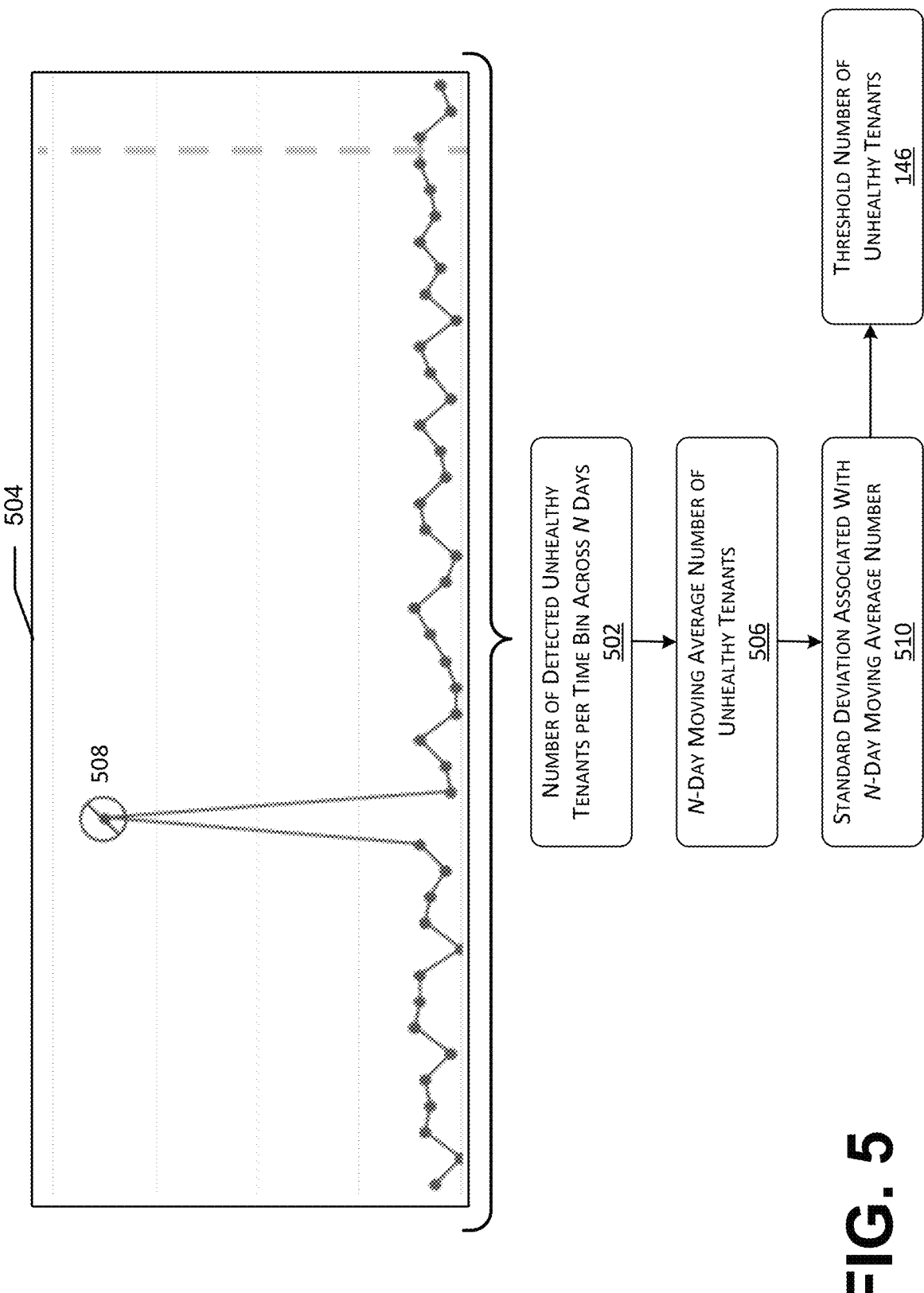
FIG. 5 is a diagram illustrating an example approach to calculating the threshold number of unhealthy tenants.

FIG. 5 is a diagram illustrating an example approach to calculating the threshold number of unhealthy tenants 146. In this example, the health aggregation module 110 receives values representing the number of detected unhealthy tenants, per time bin, across a defined N number of units of time such as days (e.g., N equals seven days, fourteen days, thirty days), as plotted via chart 504. The health aggregation module 110 then calculates an N-day moving average number of unhealthy tenants 506. In various examples, the health aggregation module 110 omits anomalous values (e.g., removes the highest 2% of values and/or the lowest 2% of values) when calculating the N-day moving average number of unhealthy tenants 506. This would remove values that have a significant impact on the N-day moving average number of unhealthy tenants 506, such as value 508.

Next, the health aggregation module 110 calculates the standard deviation 510 associated with the N-day moving average number 506. The standard deviation 510 is the square root of the variance of the N-day moving average number 506, and is commonly referred to as sigma, or "σ". The health aggregation module 110 calculates the deviation of each number of unhealthy tenants per time bin, and squares the result. The variance is the average of the squared results and, as mentioned above, the standard deviation 510 is equal to the square root of the variance.

The health aggregation module 110 sets the threshold number of unhealthy tenants 146 to be a predefined number of standard deviations 510 (e.g., "2σ", "3σ", "4σ", "5σ") above the N-day moving average number 506. However, the health aggregation module 110 can set the threshold number of unhealthy tenants 146 in other ways as well. For example, the health aggregation module 110 can set the threshold number of unhealthy tenants 146 to be a predefined percentage (e.g., 10%, 20%, 30%) above the N-day moving average number 506.

FIG. 6 is a diagram illustrating an example approach to verifying the quality of data used in the training dataset by filtering out data that does not satisfy defined criteria. The calculation module 104 ensures the quality of the training dataset 116 by implementing a quality verification check 602 using certain criteria 604. If the criteria 604 are not met, the calculation module 104 can exclude a tenant/resource combination from the aggregation of unhealthy tenants to improve the precision at which a network connectivity issue can be detected.

A first example criterion 604 requires a non-missing value or a non-zero value within a predefined most recent time period 606 (e.g., the most recent twenty-four hours) of the training time period 122 (e.g., fourteen days). For example, in the diagram on the left side of FIG. 6, the predefined most recent time period is twenty-four hours 608, and during this twenty-four hours a non-missing or a non-zero value 610 must be produced to satisfy the first example criterion. If the first example criterion is not met, the tenant/resource combination is deemed to likely be a deleted resource which causes the network traffic signal to include false network traffic drops (e.g., failure to receive requests) that negatively affect the quality of the training dataset 116.

A second example criterion 604 requires that at least a threshold percentage (e.g., 50%) of the values associated with network traffic signal are a non-missing value or a non-zero value 612 within the training time period 122. For example, in the diagram on the left side of FIG. 6, fifty percent of values in the training dataset 116 must include a non-missing value or a non-zero value 614. If the second example criterion is not met, the tenant/resource combination is likely an inactive resource which also causes the network traffic signal to include false network traffic drops that negatively affect the quality of the training dataset 116.

A third example criterion 604 requires that a value for each time bin in the training time period satisfies a threshold value 616. For example, in the diagram on the left side of FIG. 6, the value for each time bin must indicate that the time bin includes at least ten requests 618. The third example criterion is used to avoid false positives due to lower network traffic volume tenants, which are relatively more susceptible to volatility. That is, a drop of first tenant's requests from an expected value of four to a value of two is more likely normal, and thus, not as significant as a drop of second tenant's requests from an expected value of one hundred to a value of fifty.

Figure 7:
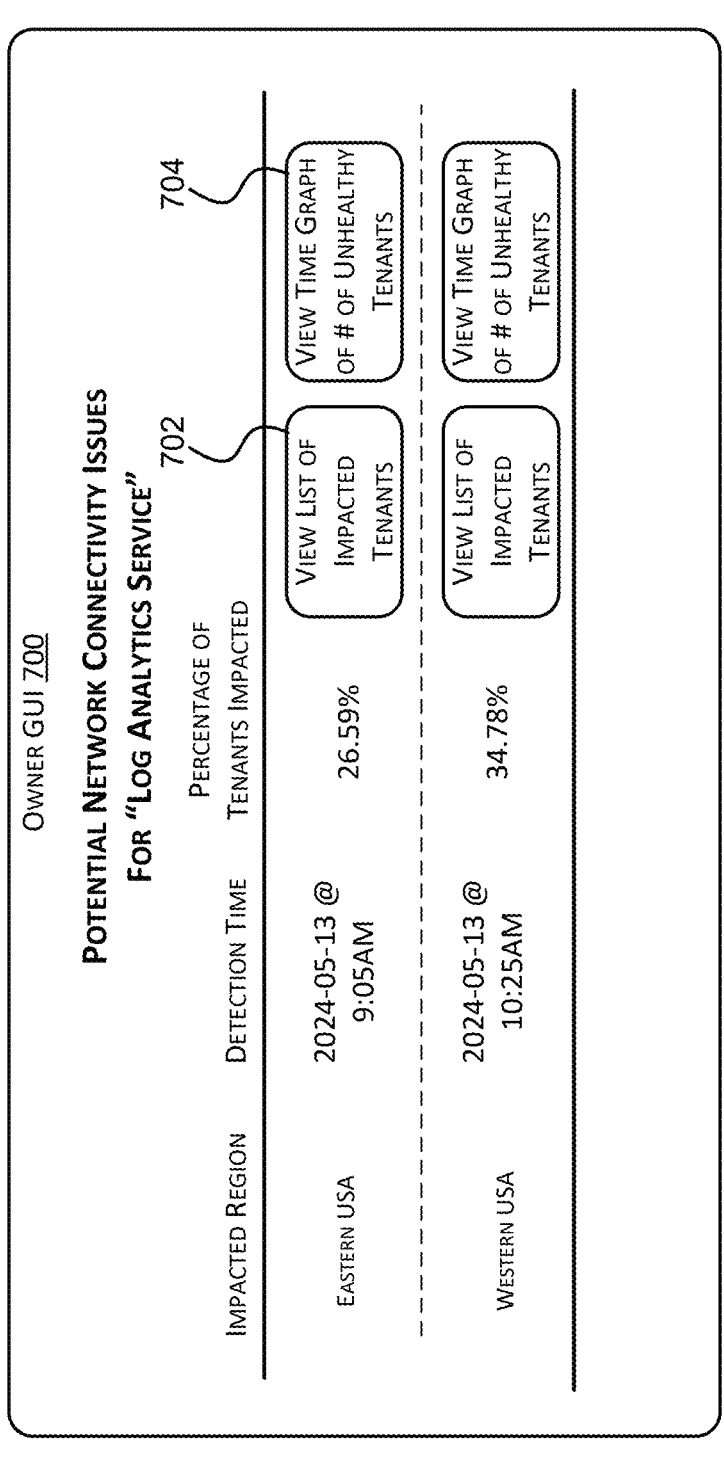
FIG. 7 illustrates an example graphical user interface that includes a notification and/or other information related to a potential network connectivity issue.

FIG. 7 illustrates an example graphical user interface (GUI) 700 that includes a notification 148 of a potential network connectivity issue and/or other information related to the potential network connectivity issue. As described above, the notification 148 is provided to an owner of the cloud service 150 (e.g., a representative tasked with reviewing and/or mitigating the potential network connectivity issue). In the example of FIG. 7, the cloud service 102 is a "Log Analytics Service", and thus, the notifications 148 in the GUI 700 list potential network connectivity issues that are specific to the "Log Analytics Service".

In this example, an individual notification 148 includes information for an individual entry in the GUI 700. The first entry in the GUI 700 indicates that the impacted geographic region is "Eastern USA" and the detection time is "2024 May 13 @ 9:05 AM". Moreover, the entries can include information indicative of the severity of the potential network connectivity issue, such as the percentage of tenants impacted (e.g., "26.59%" in the first entry). The second entry in the GUI 700 indicates that the impacted geographic region is "Western USA" and the detection time is "2024 May 13 @ 10:25 AM". Moreover, the second entry indicates that "34.78%" of tenants were impacted in the "Western USA" geographic region. Each entry can be associated with selectable GUI elements configured to convey additional information. For instance, a first GUI element 702, when selected, enable a user to view the list of impacted tenants (e.g., the actual tenant identifications). Moreover, a second GUI element 704, when selected, enables the user to view a time graph of a number of unhealthy tenants. Accordingly, the user can review the aggregate network traffic behavior that led to the large-scale anomaly being detected.

Proceeding to FIG. 8, aspects of a method 800 for detecting network connectivity issues for a cloud service are shown. With respect to FIG. 8, the process 800 begins at operation 802 where the system generates a tenant-specific model that projects a network traffic pattern by analyzing a training dataset that includes values associated with a network traffic signal for a tenant over a training time period. As described above, the network traffic signal is associated with a service offered by a cloud provider and the network traffic pattern establishes a baseline threshold value for each defined time bin in a plurality of defined time bins across the training time period At operation 804, the system determines that a current value associated with the network traffic signal for a current time bin is less than the baseline threshold value established for a corresponding time bin, as defined in the tenant-specific model.

At operation 806, the system, in response to determining that the current value associated with the network traffic signal for the current time bin is less than the baseline threshold value, designates the tenant as an unhealthy tenant due to abnormal network traffic behavior.

At operation 808, the system determines that a total number of unhealthy tenants for the current time bin is greater than a predefined threshold number of unhealthy tenants.

At operation 810, the system sends, to an owner of the service and based on the total number of unhealthy tenants being greater than the predefined threshold number of unhealthy tenants, a notification indicating a potential network connectivity issue associated with the service.

For ease of understanding, the method discussed in this disclosure is delineated as separate operations represented as independent blocks. However, these separately delineated operations should not be construed as necessarily order dependent in their performance. The order in which the method is described is not intended to be construed as a limitation, and any number of the described method blocks may be combined in any order to implement the method or an alternate method. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated method can end at any time and need not be performed in its entirety. Some or all operations of the method, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the method 800 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the method 800 may also be implemented in other ways. In addition, one or more of the operations of the method 800 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 9:
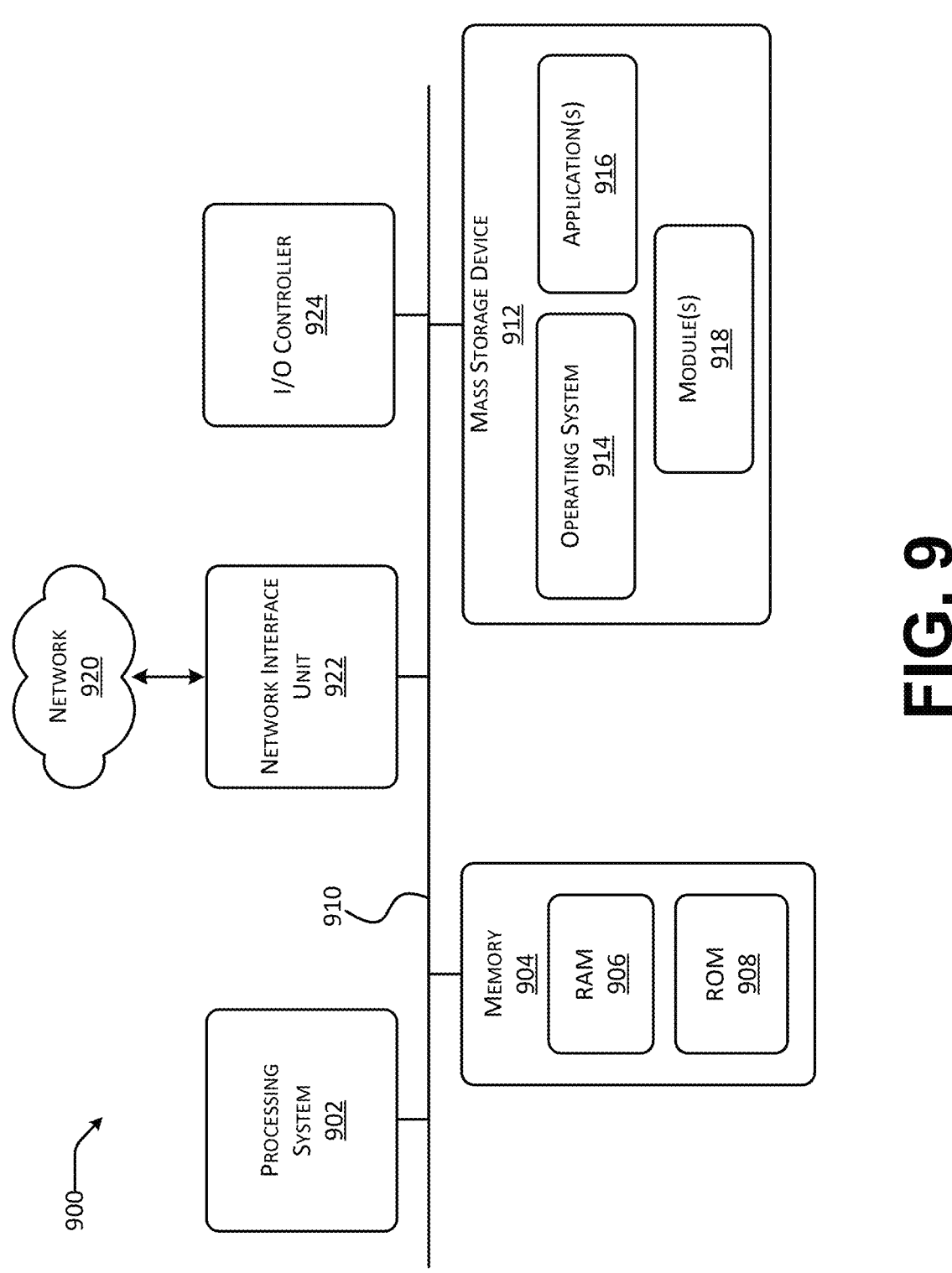
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a device, such as a computer or a server configured as part of the system 100, capable of executing computer instructions (e.g., a module described herein). The computer architecture 900 illustrated in FIG. 9 includes processing system 902, a system memory 904, including a random-access memory 906 (RAM) and a read-only memory (ROM) 908, and a system bus 910 that couples the memory 904 to the processing system 902. The processing system 902 comprises processing unit(s). In various examples, the processing unit(s) of the processing system 902 are distributed. Stated another way, one processing unit of the processing system 902 may be located in a first location (e.g., a rack within a datacenter) while another processing unit of the processing system 902 is located in a second location separate from the first location.

Processing unit(s), such as processing unit(s) of processing system 902, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918, and other data described herein.

The mass storage device 912 is connected to processing system 902 through a mass storage controller connected to the bus 910. The mass storage device 912 and its associated computer-readable media provide non-volatile storage for the computer architecture 900. Although the description of computer-readable media contained herein refers to a mass storage device, the computer-readable media can be any available computer-readable storage media or communication media that can be accessed by the computer architecture 900.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910. The computer architecture 900 also may include an input/output controller 924 for receiving and processing input from a number of other devices, including a keyboard, mouse, touch, or electronic stylus or pen. Similarly, the input/output controller 924 may provide output to a display screen, a printer, or other type of output device.

The software components described herein may, when loaded into the processing system 502 and executed, transform the processing system 902 and the overall computer architecture 900 from a general-purpose computing system into a special-purpose computing system customized to facilitate the functionality presented herein. The processing system 902 may be constructed from any number of transistors or other discrete circuit elements, which may individually or collectively assume any number of states. More specifically, the processing system 902 may operate as a finite-state machine, in response to executable instructions contained within the software modules disclosed herein. These computer-executable instructions may transform the processing system 902 by specifying how the processing system 902 transition between states, thereby transforming the transistors or other discrete hardware elements constituting the processing system 902.

The disclosure presented herein also encompasses the subject matter set forth in the following clauses.

Example Clause A, a method comprising: generating a tenant-specific model that projects a network traffic pattern by analyzing a training dataset including values associated with a network traffic signal for a tenant over a training time period, wherein: the network traffic signal is associated with a service offered by a cloud provider; and the network traffic pattern establishes a baseline threshold value for each defined time bin in a plurality of defined time bins across the training time period; determining that a current value associated with the network traffic signal for a current time bin is less than the baseline threshold value established for a corresponding time bin in the tenant-specific model; in response to determining that the current value associated with the network traffic signal for the current time bin is less than the baseline threshold value, designating the tenant as an unhealthy tenant due to abnormal network traffic behavior; determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential network connectivity issue associated with the service.

Example Clause B, the method of Example Clause A, wherein the network traffic signal and the tenant-specific model are associated with a resource deployed by the service and for the tenant within a defined geographic region of a cloud platform or a distributed computing environment.

Example Clause C, the method of Example Clause A or Example Clause B, wherein the baseline threshold value for each defined time bin in the plurality of defined time bins across the training time period is established by: identifying, in the training dataset, one or more patterns in one or more respective time series; for each of the one or more patterns: producing a residual training dataset by removing the pattern from the values associated with the network traffic signal;

producing a transformed training dataset by applying a power transformation to the residual training dataset to stabilize a variance and normalize a distribution in the residual training dataset; projecting a normal range for each defined time bin in the plurality of defined time bins across the training time period by applying an adjusted boxplot to the transformed training dataset; and using a lower bound of the normal range to establish the baseline threshold value for each defined time bin in the plurality of defined time bins across the training time period.

Example Clause D, the method of any one of Example Clauses A through C, further comprising verifying, for quality purposes, that the values associated with the network traffic signal include a non-missing value or a non-zero value within a most recent defined time period within the training time period prior to analyzing the training dataset to generate the tenant-specific model.

Example Clause E, the method of any one of Example Clauses A through D, further comprising verifying, for data quality purposes, that at least a threshold percentage of the values associated with the network traffic signal include a non-missing value or a non-zero value prior to analyzing the training dataset to generate the tenant-specific model.

Example Clause F, the method of any one of Example Clauses A through E, further comprising verifying, for data quality purposes, that the values associated with the network traffic signal include at least a threshold number of requests for each time bin within the training time period prior to analyzing the training dataset to generate the tenant-specific model.

Example Clause G, the method of any one of Example Clauses A through F, further comprising establishing the predefined threshold number of unhealthy tenants by: calculating an average number of unhealthy tenants across time bins in a defined number N of days; calculating a standard deviation associated with the average number of unhealthy tenants; and setting the predefined threshold number of unhealthy tenants to be a predefined number of standard deviations above the average number of unhealthy tenants.

Example Clause H, the method of any one of Example Clauses A through G, wherein the network traffic signal comprises a total number of requests received on behalf of the tenant.

Example Clause I, the method of any one of Example Clauses A through H, wherein the notification comprises information that indicates an impacted geographic region, a detection time, and a percentage of tenants impacted.

Example Clause J, a system comprising: a processing system; and a computer-readable medium storing instructions that, when executed by the processing system, cause the system to perform operations comprising: generating a tenant-specific model that projects a network traffic pattern by analyzing a training dataset including values associated with a network traffic signal for a tenant over a training time period, wherein: the network traffic signal is associated with a service offered by a cloud provider; and the network traffic pattern projects a baseline threshold value for each defined time bin in a plurality of defined time bins across the training time period; determining that a current value associated with the network traffic signal for a current time bin is inconsistent with the baseline threshold value projected for the current time bin; in response to determining that the current value associated with the network traffic signal for the current time bin is inconsistent with the baseline threshold value projected for the current time bin, designating the tenant as an unhealthy tenant due to abnormal network traffic behavior; determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential network connectivity issue associated with the service.

Example Clause K, the system of Example Clause J, wherein the network traffic signal and the tenant-specific model are associated with a resource deployed by the service and for the tenant within a defined geographic region of a cloud platform or a distributed computing environment.

Example Clause L, the system of Example Clause J or Example Clause K, wherein the baseline threshold value for each defined time bin in the plurality of defined time bins across the training time period is established by: identifying, in the training dataset, one or more patterns in one or more respective time series; for each of the one or more patterns: producing a residual training dataset by removing the pattern from the values associated with the network traffic signal; producing a transformed training dataset by applying a power transformation to the residual training dataset to stabilize a variance and normalize a distribution in the residual training dataset; projecting a normal range for each defined time bin in the plurality of defined time bins across the training time period by applying an adjusted boxplot to the transformed training dataset; and using a lower bound of the normal range to establish the baseline threshold value for each defined time bin in the plurality of defined time bins across the training time period.

Example Clause M, the system of any one of Example Clauses J through L, wherein the operations further comprise verifying, for quality purposes, that the values associated with the network traffic signal include a non-missing value or a non-zero value within a most recent defined time period within the training time period prior to analyzing the training dataset to generate the tenant-specific model.

Example Clause N, the system of any one of Example Clauses J through M, wherein the operations further comprise verifying, for data quality purposes, that at least a threshold percentage of the values associated with the network traffic signal include a non-missing value or a non-zero value prior to analyzing the training dataset to generate the tenant-specific model.

Example Clause O, the system of any one of Example Clauses J through N, wherein the operations further comprise verifying, for data quality purposes, that the values associated with the network traffic signal include at least a threshold number of requests for each time bin within the training time period prior to analyzing the training dataset to generate the tenant-specific model.

Example Clause P, the system of any one of Example Clauses J through O, wherein the operations further comprise establishing the predefined threshold number of unhealthy tenants by: calculating an average number of unhealthy tenants across time bins in a defined number N of days; calculating a standard deviation associated with the average number of unhealthy tenants; and setting the predefined threshold number of unhealthy tenants to be a predefined number of standard deviations above the average number of unhealthy tenants.

Example Clause Q, the system of any one of Example Clauses J through P, wherein the network traffic signal comprises a total number of requests received on behalf of the tenant.

Example Clause R, the system of any one of Example Clauses J through Q, wherein the notification comprises information that indicates an impacted geographic region, a detection time, and a percentage of tenants impacted.

Example Clause S, a computer-readable storage medium storing instructions that, when executed by a processing system, cause a system to perform operations comprising: generating a tenant-specific model that projects a network traffic pattern by analyzing a training dataset including values associated with a network traffic signal for a tenant over a training time period, wherein: the network traffic signal is associated with a service offered by a cloud provider; and the network traffic pattern establishes a baseline threshold value for each defined time bin in a plurality of defined time bins across the training time period; determining that a current value associated with the network traffic signal for a current time bin is less than the baseline threshold value established for a corresponding time bin in the tenant-specific model; in response to determining that the current value associated with the network traffic signal for the current time bin is less than the baseline threshold value, designating the tenant as an unhealthy tenant due to abnormal network traffic behavior; determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential network connectivity issue associated with the service.

Example Clause T, the computer-readable storage medium of Example Clause S, wherein the network traffic signal and the tenant-specific model are associated with a resource deployed by the service and for the tenant within a defined geographic region of a cloud platform or a distributed computing environment.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:

generating a tenant-specific model that projects a network traffic pattern by analyzing a training dataset including values associated with a network traffic signal for a tenant over a training time period, wherein:

the network traffic signal is associated with a service offered by a cloud provider; and the network traffic pattern establishes a baseline threshold value for each defined time bin in a plurality of defined time bins across the training time period;

determining that a current value associated with the network traffic signal for a current time bin is less than the baseline threshold value established for a corresponding time bin in the tenant-specific model;

in response to determining that the current value associated with the network traffic signal for the current time bin is less than the baseline threshold value, designating the tenant as an unhealthy tenant due to abnormal network traffic behavior;

determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential network connectivity issue associated with the service.

2. The method of claim 1, wherein the network traffic signal and the tenant-specific model are associated with a resource deployed by the service and for the tenant within a defined geographic region of a cloud platform or a distributed computing environment.

3. The method of claim 1, wherein the baseline threshold value for each defined time bin in the plurality of defined time bins across the training time period is established by:

identifying, in the training dataset, one or more patterns in one or more respective time series;

for each of the one or more patterns:

producing a residual training dataset by removing the pattern from the values associated with the network traffic signal;

producing a transformed training dataset by applying a power transformation to the residual training dataset to stabilize a variance and normalize a distribution in the residual training dataset;

projecting a normal range for each defined time bin in the plurality of defined time bins across the training time period by applying an adjusted boxplot to the transformed training dataset; and using a lower bound of the normal range to establish the baseline threshold value for each defined time bin in the plurality of defined time bins across the training time period.

4. The method of claim 1, further comprising verifying, for quality purposes, that the values associated with the network traffic signal include a non-missing value or a non-zero value within a most recent defined time period within the training time period prior to analyzing the training dataset to generate the tenant-specific model.

5. The method of claim 1, further comprising verifying, for data quality purposes, that at least a threshold percentage of the values associated with the network traffic signal include a non-missing value or a non-zero value prior to analyzing the training dataset to generate the tenant-specific model.

6. The method of claim 1, further comprising verifying, for data quality purposes, that the values associated with the network traffic signal include at least a threshold number of requests for each time bin within the training time period prior to analyzing the training dataset to generate the tenant-specific model.

7. The method of claim 1, further comprising establishing the predefined threshold number of unhealthy tenants by:

calculating an average number of unhealthy tenants across time bins in a defined number N of days;

calculating a standard deviation associated with the average number of unhealthy tenants; and setting the predefined threshold number of unhealthy tenants to be a predefined number of standard deviations above the average number of unhealthy tenants.

8. The method of claim 1, wherein the network traffic signal comprises a total number of requests received on behalf of the tenant.

9. The method of claim 1, wherein the notification comprises information that indicates an impacted geographic region, a detection time, and a percentage of tenants impacted.

10. A system comprising:

a processing system; and a computer-readable medium storing instructions that, when executed by the processing system, cause the system to perform operations comprising:

generating a tenant-specific model that projects a network traffic pattern by analyzing a training dataset including values associated with a network traffic signal for a tenant over a training time period, wherein:

the network traffic signal is associated with a service offered by a cloud provider; and the network traffic pattern projects a baseline threshold value for each defined time bin in a plurality of defined time bins across the training time period;

determining that a current value associated with the network traffic signal for a current time bin is inconsistent with the baseline threshold value projected for the current time bin;

in response to determining that the current value associated with the network traffic signal for the current time bin is inconsistent with the baseline threshold value projected for the current time bin, designating the tenant as an unhealthy tenant due to abnormal network traffic behavior;

determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential network connectivity issue associated with the service.

11. The system of claim 10, wherein the network traffic signal and the tenant-specific model are associated with a resource deployed by the service and for the tenant within a defined geographic region of a cloud platform or a distributed computing environment.

12. The system of claim 10, wherein the baseline threshold value for each defined time bin in the plurality of defined time bins across the training time period is established by:

identifying, in the training dataset, one or more patterns in one or more respective time series;

for each of the one or more patterns:

producing a residual training dataset by removing the pattern from the values associated with the network traffic signal;

producing a transformed training dataset by applying a power transformation to the residual training dataset to stabilize a variance and normalize a distribution in the residual training dataset;

projecting a normal range for each defined time bin in the plurality of defined time bins across the training time period by applying an adjusted boxplot to the transformed training dataset; and using a lower bound of the normal range to establish the baseline threshold value for each defined time bin in the plurality of defined time bins across the training time period.

13. The system of claim 10, wherein the operations further comprise verifying, for quality purposes, that the values associated with the network traffic signal include a non-missing value or a non-zero value within a most recent defined time period within the training time period prior to analyzing the training dataset to generate the tenant-specific model.

14. The system of claim 10, wherein the operations further comprise verifying, for data quality purposes, that at least a threshold percentage of the values associated with the network traffic signal include a non-missing value or a non-zero value prior to analyzing the training dataset to generate the tenant-specific model.

15. The system of claim 10, wherein the operations further comprise verifying, for data quality purposes, that the values associated with the network traffic signal include at least a threshold number of requests for each time bin within the training time period prior to analyzing the training dataset to generate the tenant-specific model.

16. The system of claim 10, wherein the operations further comprise establishing the predefined threshold number of unhealthy tenants by:

calculating an average number of unhealthy tenants across time bins in a defined number N of days;

calculating a standard deviation associated with the average number of unhealthy tenants; and setting the predefined threshold number of unhealthy tenants to be a predefined number of standard deviations above the average number of unhealthy tenants.

17. The system of claim 10, wherein the network traffic signal comprises a total number of requests received on behalf of the tenant.

18. The system of claim 10, wherein the notification comprises information that indicates an impacted geographic region, a detection time, and a percentage of tenants impacted.

19. A computer-readable storage medium storing instructions that, when executed by a processing system, cause a system to perform operations comprising:

generating a tenant-specific model that projects a network traffic pattern by analyzing a training dataset including values associated with a network traffic signal for a tenant over a training time period, wherein:

the network traffic signal is associated with a service offered by a cloud provider; and the network traffic pattern establishes a baseline threshold value for each defined time bin in a plurality of defined time bins across the training time period;

determining that a current value associated with the network traffic signal for a current time bin is less than the baseline threshold value established for a corresponding time bin in the tenant-specific model;

in response to determining that the current value associated with the network traffic signal for the current time bin is less than the baseline threshold value, designating the tenant as an unhealthy tenant due to abnormal network traffic behavior;

determining that a total number of unhealthy tenants for the current time bin is greater than a predefined threshold number of unhealthy tenants; and sending, to an owner of the service and based on the total number of unhealthy tenants being greater than the predefined threshold number of unhealthy tenants, a notification indicating a potential network connectivity issue associated with the service.

20. The computer-readable storage medium of claim 19, wherein the network traffic signal and the tenant-specific model are associated with a resource deployed by the service and for the tenant within a defined geographic region of a cloud platform or a distributed computing environment.

\* \* \* \* \*